US005498870A

United States Patent [19]
Ishizuka

[11] Patent Number: 5,498,870
[45] Date of Patent: Mar. 12, 1996

[54] ROTATION INFORMATION DETECTION APPARATUS

[75] Inventor: Koh Ishizuka, Ohmiya, Japan

[73] Assignee: Canon Kabushiki Kaisha, Tokyo, Japan

[21] Appl. No.: 380,934

[22] Filed: Jan. 31, 1995

Related U.S. Application Data

[63] Continuation of Ser. No. 125,237, Sep. 23, 1993, abandoned.

[30] Foreign Application Priority Data

Sep. 25, 1992 [JP] Japan .................................. 4-280681
Sep. 7, 1993 [JP] Japan .................................. 5-247587

[51] Int. Cl.$^6$ .............................. H01J 3/14; G01D 5/34
[52] U.S. Cl. .............................. 250/237 G; 250/231.16; 356/374
[58] Field of Search .................. 250/237 G, 231.14, 250/231.16; 356/374

[56] References Cited

U.S. PATENT DOCUMENTS

| | | | |
|---|---|---|---|
| 4,792,678 | 12/1988 | Spies | 356/374 |
| 4,967,072 | 10/1990 | Nishimura | 250/237 G |
| 4,975,571 | 12/1990 | McMurtry | 356/374 |
| 5,001,340 | 3/1991 | Schwefel et al. | 250/231.16 |

FOREIGN PATENT DOCUMENTS

| | | |
|---|---|---|
| 0262349 | 4/1988 | European Pat. Off. . |
| 0365806 | 5/1990 | European Pat. Off. . |
| 0182312 | 10/1984 | Japan .................. 356/374 |

Primary Examiner—William L. Sikes
Assistant Examiner—Tiep H. Nguyen
Attorney, Agent, or Firm—Fitzpatrick, Cella, Harper & Scinto

[57] ABSTRACT

An apparatus for detecting information as for the rotation of a scale having a diffraction grating arranged thereon along a direction of detection of the rotation is constituted by a light source portion for irradiating a light beam onto a first point on the diffraction grating of said scale wherein said light source portion emitting two diffracted lights having a predetermined order from the first point by the irradiation of the light beam, a transparent substrate to be parallelly arranged in the vicinity of the surface of said scale and having a plurality of optical elements arranged thereon, said plurality of optical elements directing the two diffracted lights of the predetermined order to a second point other than said first point on the diffraction grating of said scale and a photodetector for detecting an interference light beam of the diffracted lights generated out of said second point on which the two diffracted lights of the predetermined order are incident whereby the information on the rotation of said scale relative to the photo-detector is detected by the photo-detection by said photo-detector.

11 Claims, 13 Drawing Sheets

5,498,870

1

ROTATION INFORMATION DETECTION APPARATUS

This application is a continuation of application Ser. No. 08/125,237 filed Sep. 23, 1993, now abandoned.

BACKGROUND OF THE INVENTION

1. Field of the Invention

The present invention relates to a rotation information detection apparatus, and more particularly to an apparatus which is well applicable to a rotary encoder for measuring movement information of a diffraction grating, that is, movement information of a moving object by irradiating a coherent light beam such as a laser beam to fine grating arrays such as a diffraction grating of a disk mounted on the moving object (scale), causing diffracted lights of a predetermined order from the diffraction grating to interfere each other to form an interference fringe, and counting numbers of light and dark fringes of the interference fringe.

2. Related Background Art

A rotary encoder has been known as an instrument to measure rotation information such as a rotation amount or a direction of rotation of a rotating object in an NC machine tool and the like with a high precision by using a unit of sub-micron and the like, and it has been widely used.

As a high precision and high resolution rotary encoder, a diffracted light interference type rotary encoder which determines a movement state such as a a movement distance of the moving object or other movement information by irradiating a coherent light beam such as a laser beam to a diffraction grating mounted on a moving object, causing diffracted lights of a predetermined order from the diffraction grating to interfere each other and counting numbers of light and dark fringes of the interference fringe, has been well known.

In this type of diffraction grating type rotary encoder, when high resolution and high precision are to be attained by using a fine grating (radial grating), only the diffracted lights of a predetermined order of the diffracted lights created by the fine grating are extracted by an optical system and they are superimposed in the same optical path by an appropriate optical means to get an interference signal.

In general, in a rotary encoder, it has been required that:

(1-a) A disk (rotary disk) of a small diameter having radial gratings recorded thereon with a high density is used and it is of high resolution and low inertia.

(1-b) An entire apparatus is thin and compact.

(1-c) The apparatus may be directly mounted as a unit on an object under test by separate a disk and a detection head therefrom, and it is easy to assemble.

(1-d) A measurement precision is stable against a change in an environment, particularly a temperature.

(1-e) Deterioration of an output signal and reduction of the measurement precision due to an assembly error of the disk and the detection head does not arise therein.

SUMMARY OF THE INVENTION

It is a first object of the present invention to provide an apparatus which is very compact in its construction, easy to assemble, hardly generates an error and permits high precision detection of rotation information.

The other objects of the present invention will be apparent from the following detailed description of the preferred embodiments.

DETAILED DESCRIPTION OF THE PREFERRED EMBODIMENTS

Figure 1A:
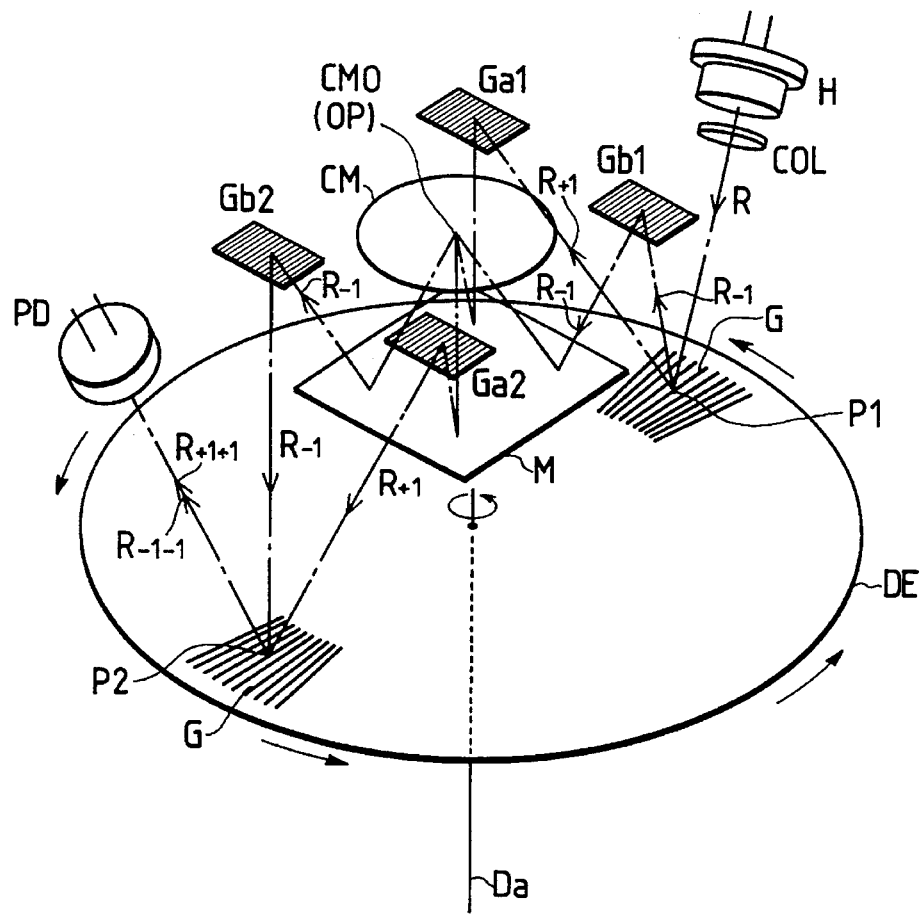
FIGS. 1A and 1B illustrate a principle of measurement in a first embodiment of the present invention.
Figure 1B:
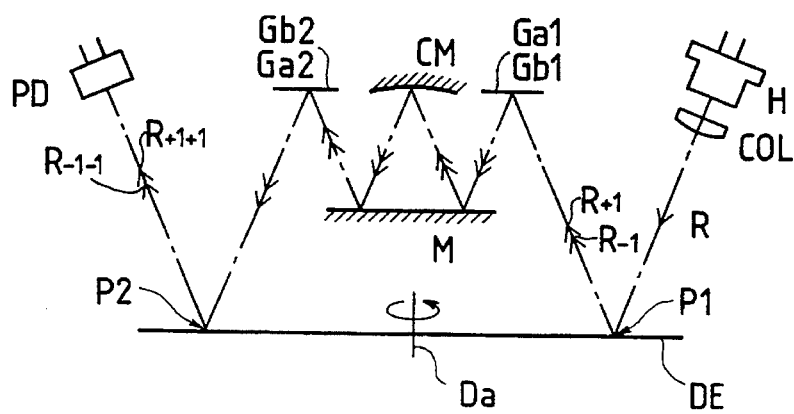

FIGS. 1A to 1F show schematic diagrams for illustrating a principle of an apparatus in a first embodiment of the present invention. FIG. 1A shows a schematic perspective view and FIG. 1B shows a schematic side view.

In FIGS. 1A and 1B, a divergence light beam emitted from a light emitting device (light source means) H such as a laser diode is converted to a condenser light beam R by a lens COL and it is obliquely irradiated onto a point P1 on a radial grating (fine grating) G comprising a diffraction grating on a disk DE coupled to a rotating object (not shown). Of reflected diffracted lights from the point P1, a +n-order diffracted light $R_{+1}$ and −n-order diffracted light $R_{-1}$ are irradiated onto first diffraction gratings Ga1 and Gb1, respectively.

The ±n-order diffracted lights $R_{+1}$ and $R_{-1}$ are reflected, diffracted and deflected by the first diffraction gratings Ga1 and Gb1, reflected by a reflection mirror M, condensed and mutually crossed at a ponit OP near on a rotation axis Da of the disk DE to cross each other, and by way of a concave mirror CM disposed so as to be a center CMO thereof arranged at the point OP, reflected by the reflection mirror M, and directed to second diffraction gratings Ga2 and Gb2.

The ±n-order diffracted lights $R_{+1}$ and $R_{-1}$ reflected, diffracted and deflected by the second diffraction gratings Ga2 and Gb2 are directed to a second point P2 on the radial grating G on the disk DE. A +n-order diffracted light $R_{+1+1}$ and a −n-order diffracted light $R_{-1-1}$ reflected and diffracted at the point P2 are obliquely superposed and emitted from the plane of the disk DE in superposition and are incident onto a photo-sensing device PD which serves as photo-sensing means.

The both diffracted lights $R_{+1+1}$ and $R_{-1-1}$ interfere each other to form one light and dark interference signal light. The photo-sensing device PD detects the interference signal light and outputs it as an electrical periodical signal. Rotation information of the radial grating G, that is the rotating object is detected by using the periodical signal from the photo-sensing device PD.

A phase of a wavefront of the n-order diffracted light is shifted by $$4\pi \cdot n \cdot N \cdot \theta / 360$$

relative to that of a wavefront of a zero-order diffracted light, where P is a grating pitch (N gratings on one entire periphery of the diffraction grating array), in is the order of the diffracted light from the radial grating G under an object, and θ (degrees) is a rotation angle of the disk DE.

Since the phases of the wavefronts are shifted from each other between the diffracted lights having different orders, the two diffracted lights are superimposed in the same optical path by the optical system to interfere each other to produce a light and dark interference signal light.

For example, when the order n of the diffraction is set by a ratio of n to 1 that is, when the +1-order diffracted light and the −1-order diffracted light are superimposed, a sine wave signal of four periods can be obtained from the photo-sensing device PD when the disk DE is rotated by one pitch (360/N degrees) of the radial grating G.

In the present embodiment, the rotation information such as the rotation angle and the rotation speed of the radial grating G, that is, the rotating object is detected by using the periodical output signal produced by the photo-sensing device PD.

In the present embodiment, the points P1 and P2 on the radial grating G lie in substantially symmetric to the rotation axis Da of the disk DE. The circumferential components of the rotation of the disk DE define by the direction illustrated by the four arrows positioned around the periphery of the disk DE in FIG. 1A. The radial components of the rotation of the disk DE define a radial direction of the disk DE in FIG. 1A (i.e., the right and left directions in FIG. 1B.

In the present embodiment, the concave mirror CM is arranged to transfer the image at the point P1 to the point P2 at a same magnification. The image at point P1 is formed by reversing a circumferential component of disk DE and a radial direction component of disk DE on point P2 against the original object by the concave mirror CM. Where the optical path of the diffracted light has a large angle relative to a principal axis of the concave mirror CM, the concave mirror preferably has a toric plane rather than a normal spherical plane.

Figure 1C:
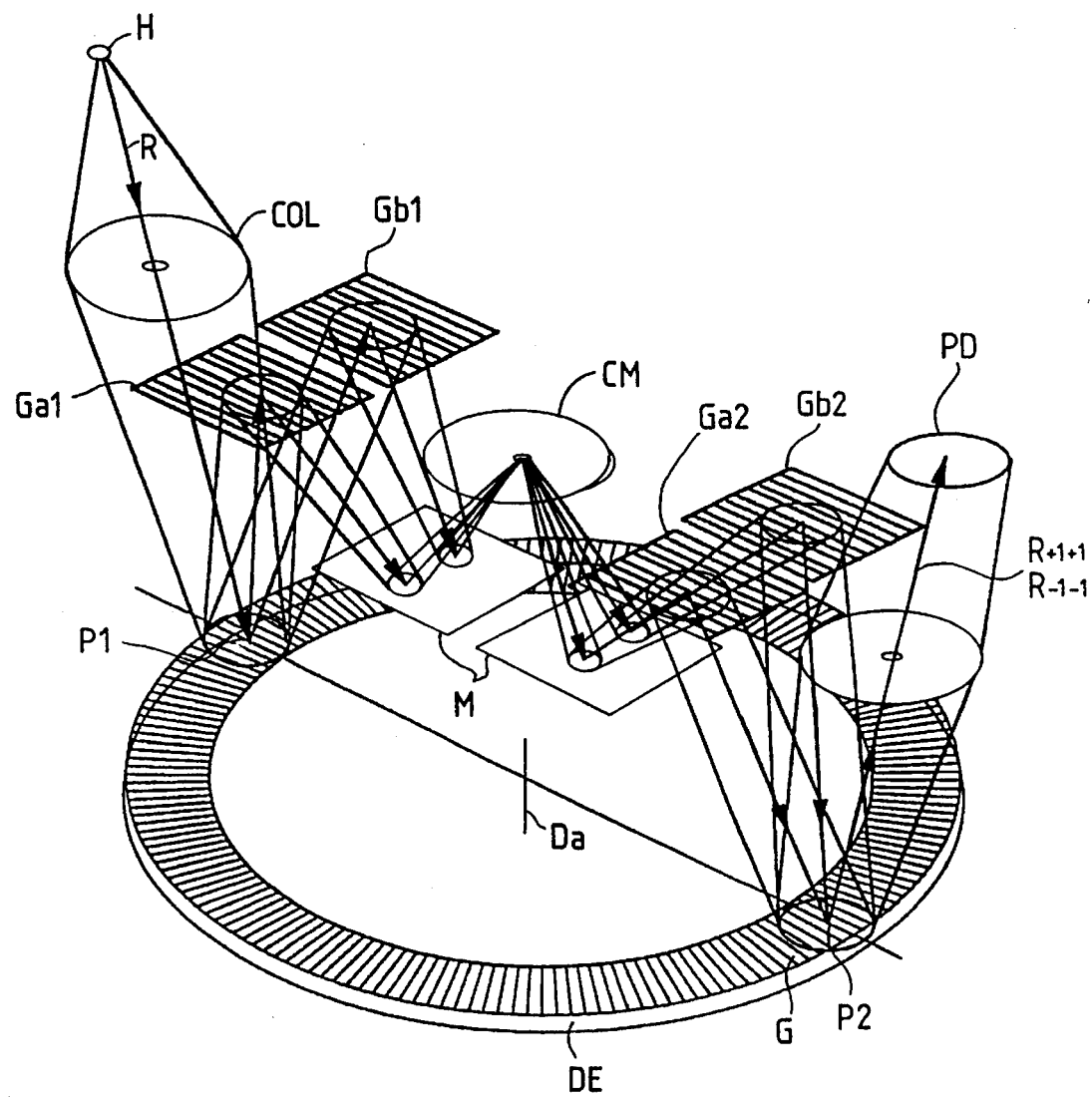
FIGS. 1C, 1D, 1E and 1F illustrate an optical path situation in the first embodiment.
Figure 1D:
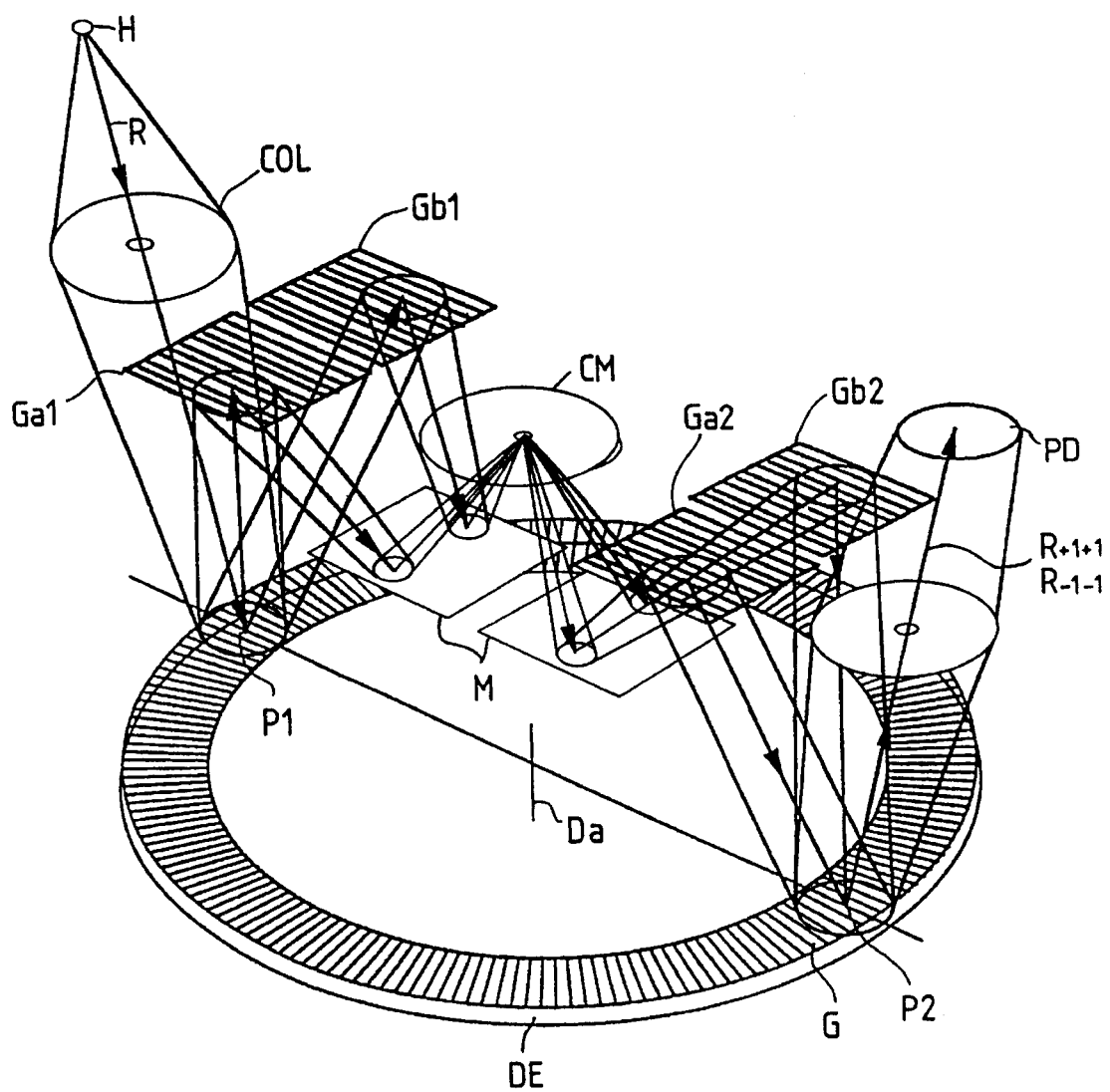

In the present embodiment, since the first diffraction gratings Ga1 and Gb1, the second diffraction gratings Ga2 and Gb2 and the reflection mirror and the like are arranged as described above;

(1) The irradiation position (P1 and P2) of the light beam to the radial grating G is not shifted even if the wavelength of the light beam from the light emitting device H varies, as seen from the comparison between a standard state shown in FIG. 1C and a wavelength change state shown in FIG. 1D, and the superposition state of the ±n-order diffracted lights $R_{+1+1}$ and $R_{-1-1}$ diffracted at and emitted from the second point P2 on the radial grating does not change so that a difference between the optical path lengths of the two ±n-order diffracted lights to the photosensing device PD does not change. In this manner, the deterioration of the output signal and the reduction of the measurement precision due to the change of the interference state are prevented and the rotation information of the rotating object is detected with a high resolution.

(2) Further, since the two light beams diffracted by the disk DE are used, the affection to the shift of the optical path of the diffracted light is small even if the rotation center axis Da of the disk DE and a normal line to the disk plane are not inclined to some extent. Thereby, the deterioration of the output signal and the reduction of the measurement precision due to the change of the interference state are prevented and the rotation information of the rotating object is detected with a high resolution.

(3) Since the light emitting device H, the optical system and the detection head having the photo-sensing device PD can be collectively arranged on one side of the disk, the disk and the detection head can be separated and they may be directly assembled on the object under test to facilitate the assembly. Further, since the disk may be directly fixed to the rotating object under test, a coupling used as the conventional technique is not necessary and the deterioration of the measurement precision due to the transmission error by the coupling is prevented, a problem of transmission delay by the coupling in a high speed rotation can be eliminated and the rotation information of the rotating object can be detected with a high resolution as the effect.

(4) When a reflected and diffracted light is used, the direction of the reflected and diffracted light is shifted when the rotation axis of the disk DE and the normal line to the disk plane are not inclined and the interference state easily become unstable. In the present embodiment, such unstableness is eliminated.

Figure 1E:
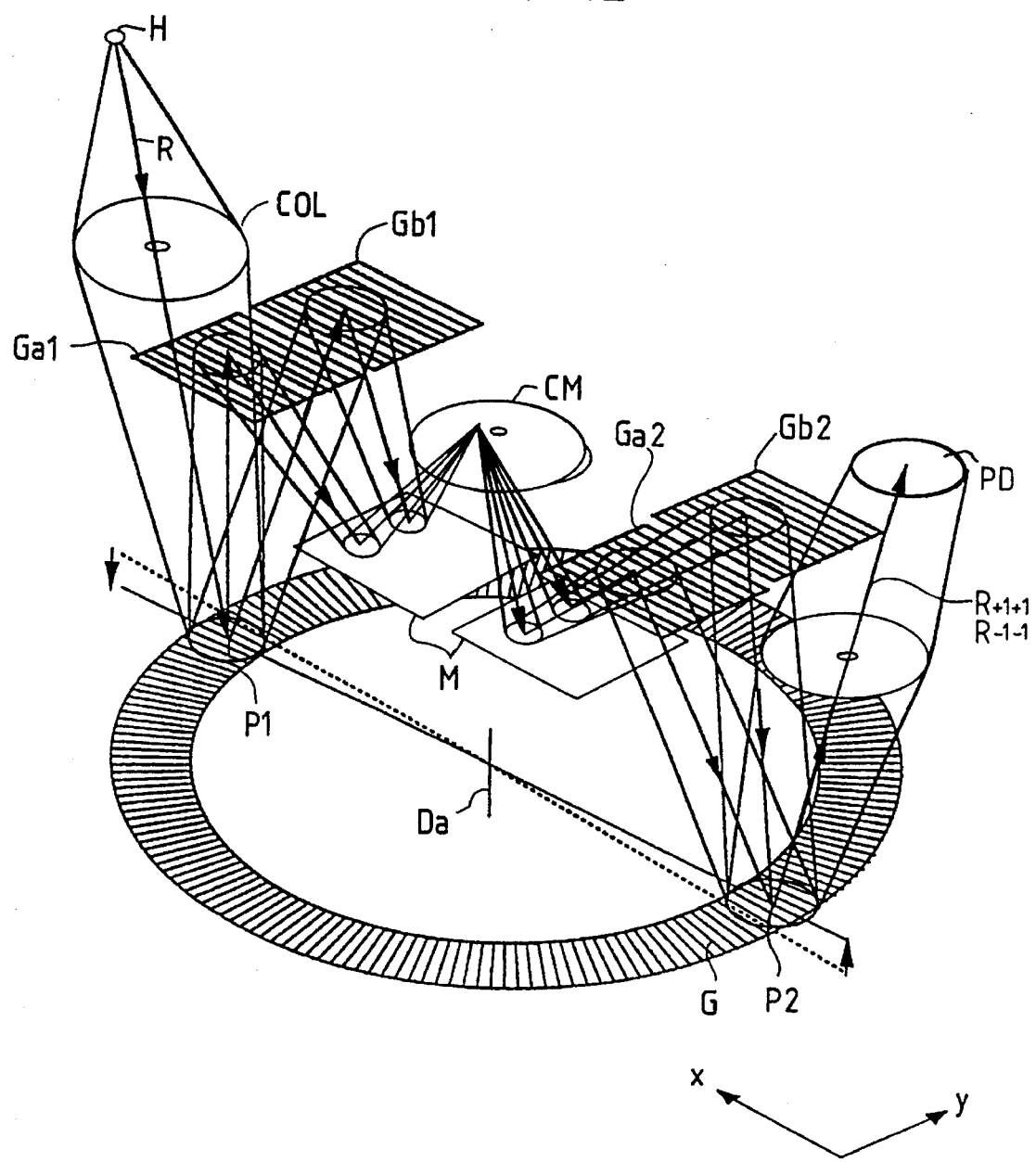
Figure 1F:
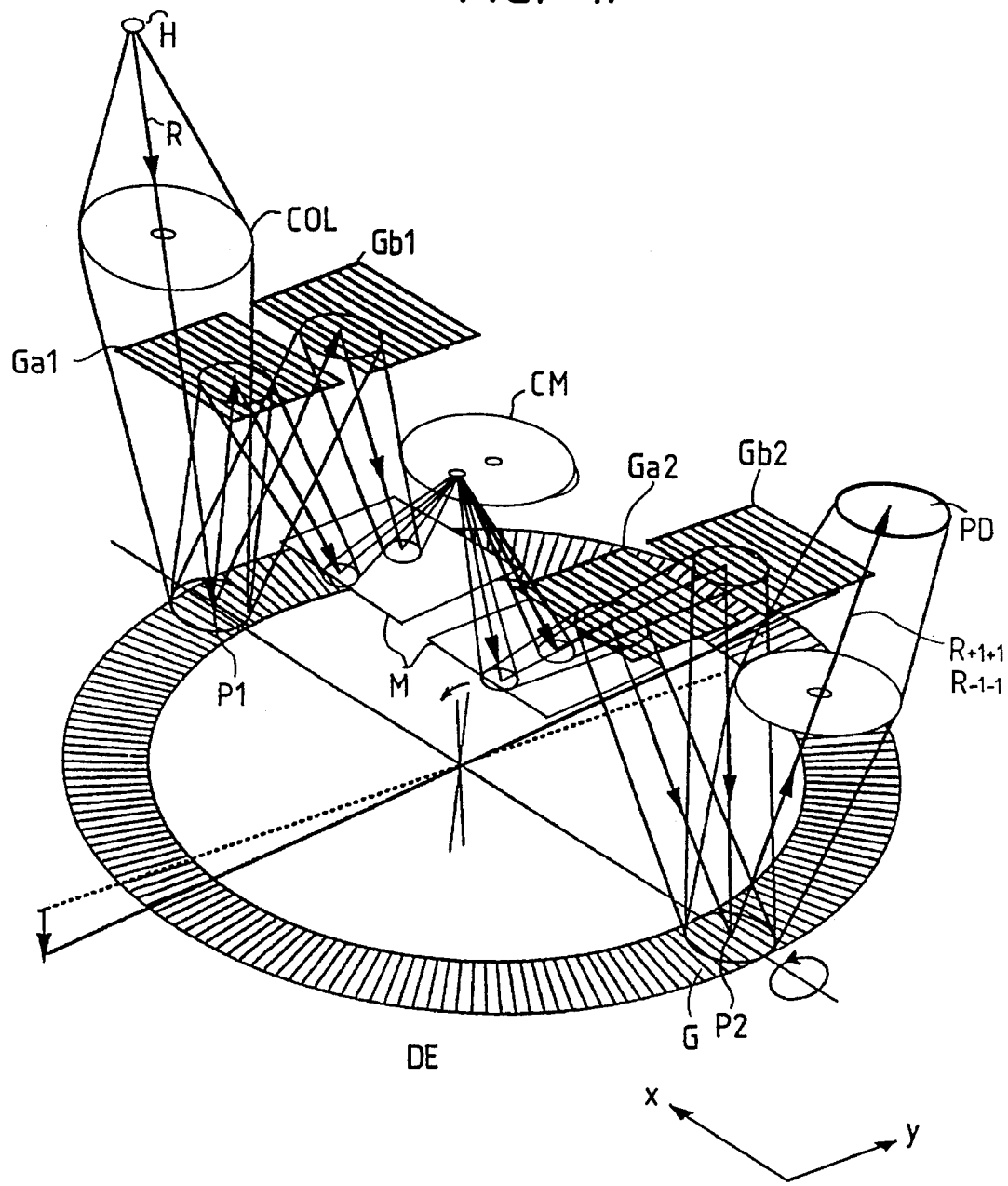

As seen from the comparison of the standard state shown in FIG. 1C and the state shown in FIGS. 1E and 1F in which the normal line to the disk DE is inclined to the x-axis and the y-axis, respectively, the irradiation points P1 and P2 of the light beam to the radial grating G are not shifted by the operation of the concave mirror CM even if the rotation axis of the disk DE is inclined relative to the normal line to the disk plane, the superposition state of the diffracted lights $R_{+1+1}$ and $R_{-1-1}$ emitted from the second irradiation points P2 does not change and the difference between the optical path lengths of the two diffracted lights to the photo-sensing device does not change. In this manner, the deterioration of the output signal and the reduction of the measurement precision due to the change of the interference state are prevented.

(5) When the reflected and diffracted light is used, the direction of the reflected and diffracted light is shifted when the rotation axis of the disk is not parallel to the normal line to the disk plane and the re-incident position of the light beam to the disk is shifted and the measurement precision is reduced. In the present embodiment, such a defect is solved.

Namely, by the operations of the concave mirror CM, the reflection mirrors M1 and M2 and the diffraction gratings Ga1, Gb1, Ga2 and Gb2, even if the rotation axis of the disk DE is shifted relative to the normal line to the disk plane, the irradiation point of the light beam to the radial grating is not shifted, the superposition state and the direction of exit of the diffracted lights $R_{+1+1}$ and $R_{-1-1}$ emitted from the second irradiation point are not shifted and the difference between the optical path lengths of the two diffracted lights to the photo-sensing device is not changed so that the deterioration of the output signal due to the change of the interference state and the reduction of the measurement precision are prevented.

(6) Since the elements in the optical paths in front of and at the back of the concave mirror CM are symmetric, the assembly of the entire apparatus is easy.

(7) The incident angle of the light beam onto points $P_1$ and $P_2$ on the radial grating G is oblique and the reflection mirrors M1 and M2 are arranged to be opposed to the concave mirror CM, the optical path is folded to design so to be thin the entire apparatus.

(8) Since the first and second diffraction gratings Ga1, Gb1, Ga2 and Gb2 and the concave mirror CM and the reflection mirror M are mutually arranged in parallel, the construction of the optical system is easy. Further, since the first and second diffraction gratings Ga1, Gb1, Ga2 and Gb2 are all arranged on one plane, they can be integrated. Since the grating pitches are also mutually equal, they can be arranged as one diffraction grating excluding the center concave mirror CM. Thus, the number of parts is further reduced and the entire assembly is simplified.

Figure 2A:
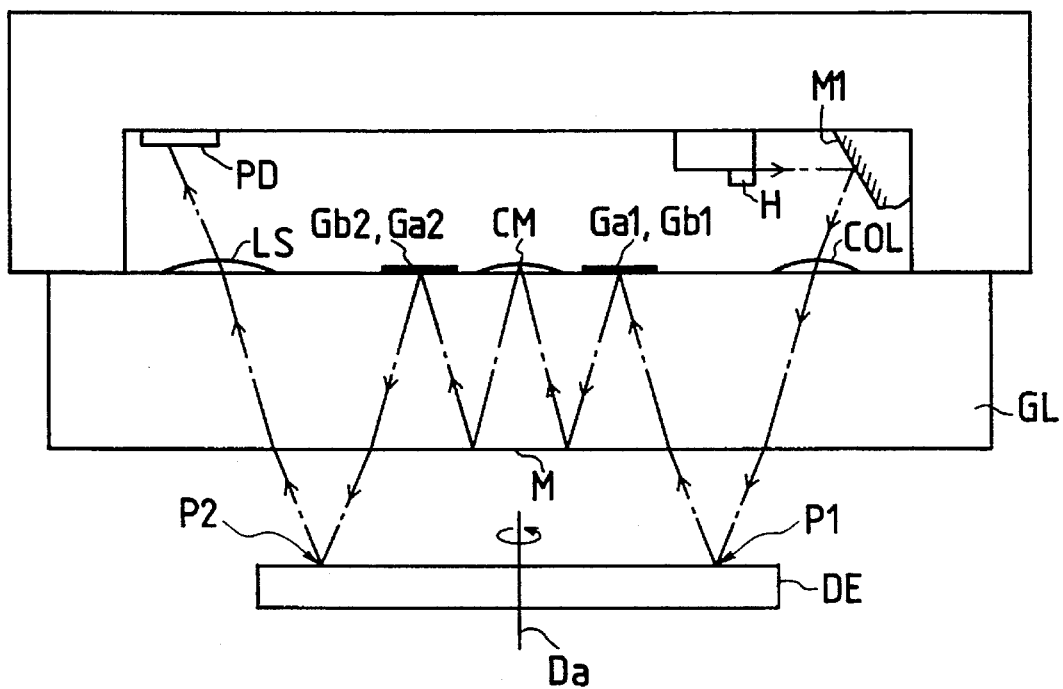
FIG. 2A shows a sectional view of the first embodiment of the present invention.

FIG. 2A shows a sectional view of a concrete construction of the present embodiment. The elements of the optical system of FIGS. 1A to 1F are integratedly shaped on a glass substrate GL, and it is mounted on a light beam projection/ receiving window of a container having the light emitting device H and the photo-sensing chip PD therein, and a concrete optical system is arranged.

The concave mirror CM, the first and second diffraction gratings Ga1, Gb1, Ga2 and Gb2, the lens COL and the lens LS for condensing the light beam onto the photo-sensing device are integrally formed on one plane of the glass substrate GL by a replica method, and a reflection film and an anti-reflection film are vapor-deposited on the other plane of the glass substrate GL to integrally form the light path defining optical elements. The concave mirror CM is formed by the replica method and the reflection film is formed by vapor-deposition thereon.

In the present embodiment thus constructed, the following effects are attained in addition to the effects described above.

(1) A very small detection head for the rotary encoder of a size in the order of millimeter is provided. By combining it with a disk having the diameter of millimeter order, a pencil size rotary encoder can be attained.

Figure 2B:
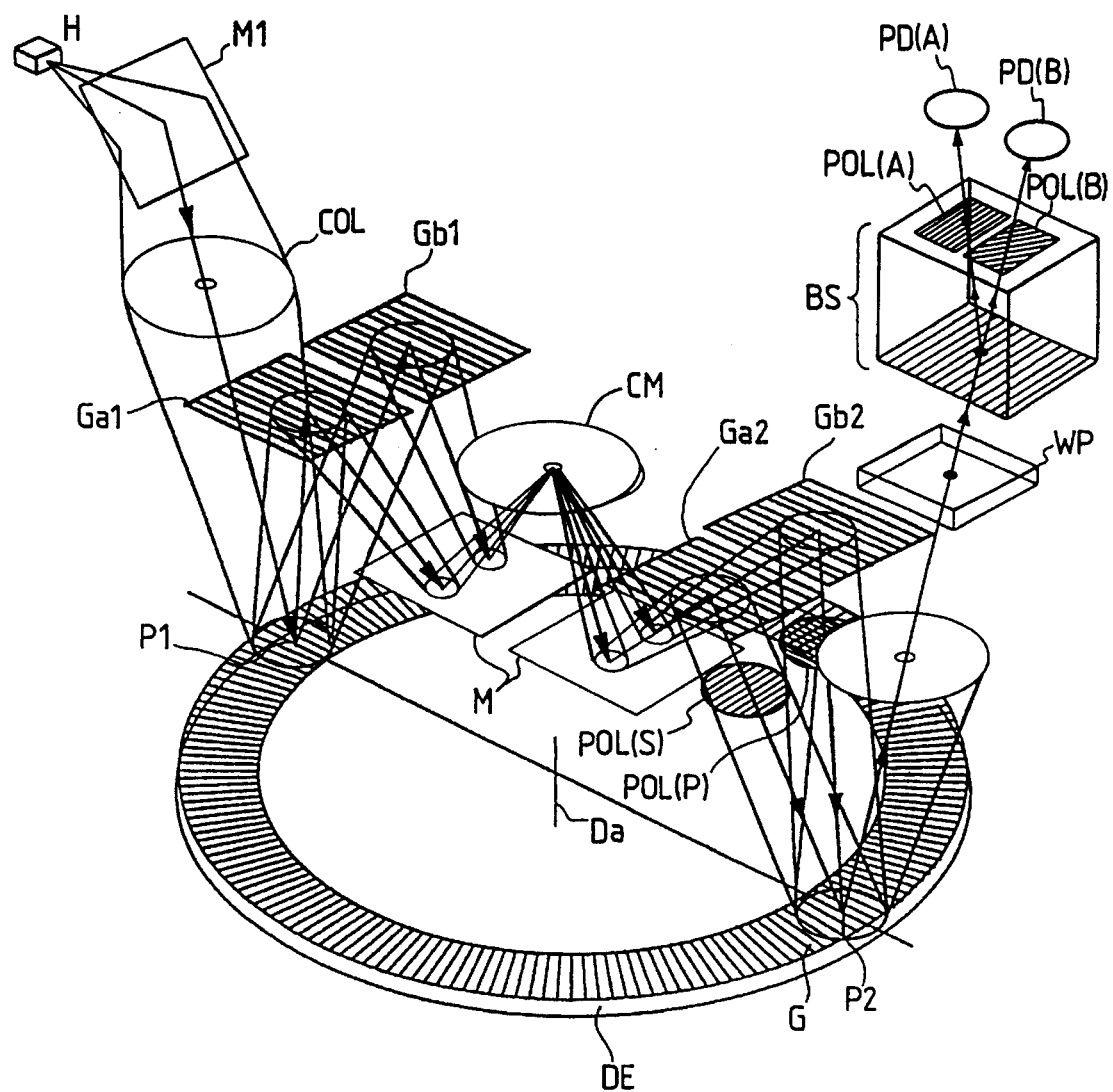
FIGS. 2B and 2C illustrate a variation of an optical path situation and a sectional view thereof in the first embodiment.
Figure 2C:
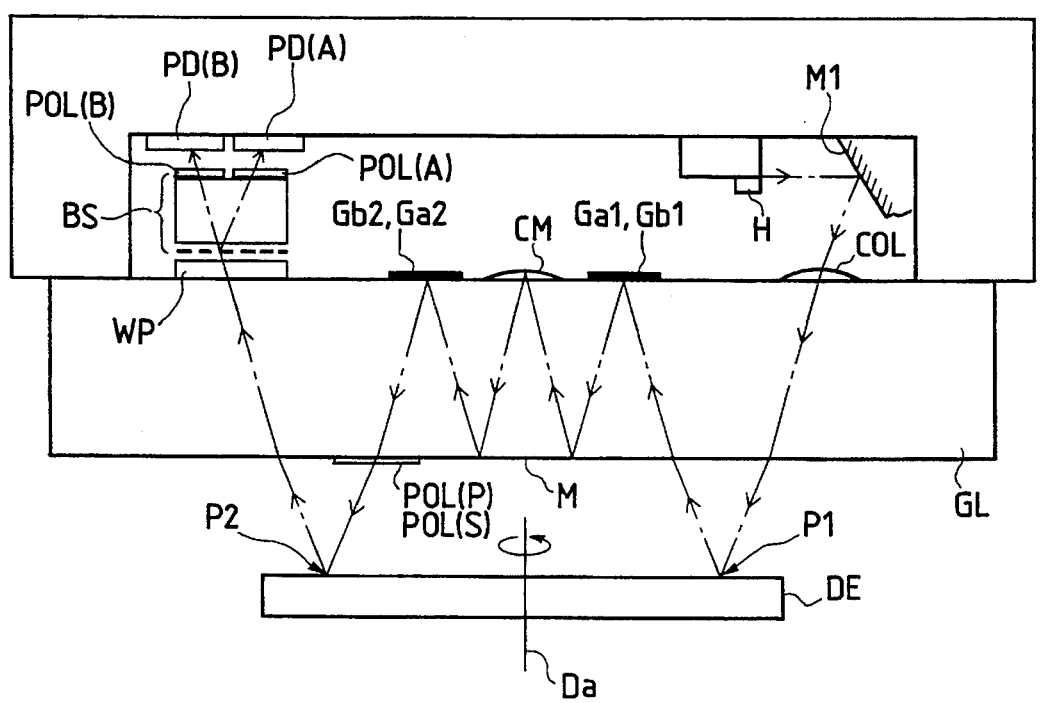

(2) Since the interference optical system is integrated on the glass substrate GL, the optical system is very stable, compact and of low cost. Where a polarization plate POL(P), POL(S) and a wavelength plate WP are applied to the glass substrate GL, only a beam splitter BS and a polarization plate POL(A), POL(B) for generating as phase difference two-phase signal light are required and the stable rotary encoder by very low cost is attained as shown in FIGS. 2B and 2C.

(3) Where the concave mirror CM and the first and second diffraction gratings Ga1, Gb1, Ga2 and Gb2 are formed by the replica method, they are subject to be damaged, but since they are arranged on same single plane, they can be integrated and are readily protected. Further, since the replica formation plane of the glass substrate is on the opposite side of the disk, it may be covered to eliminate a risk of the loss of the optical function by hitting the replica plane. As shown in FIG. 2A, the planar optical elements may be integrated on both surfaces of the glass substrate GL and it may be mounted on the light beam projection/reception window of the container having the light emitting device and the photo-sensing device therein. In this case, the replica plane is in the container, so that it is protected.

Figure 3:
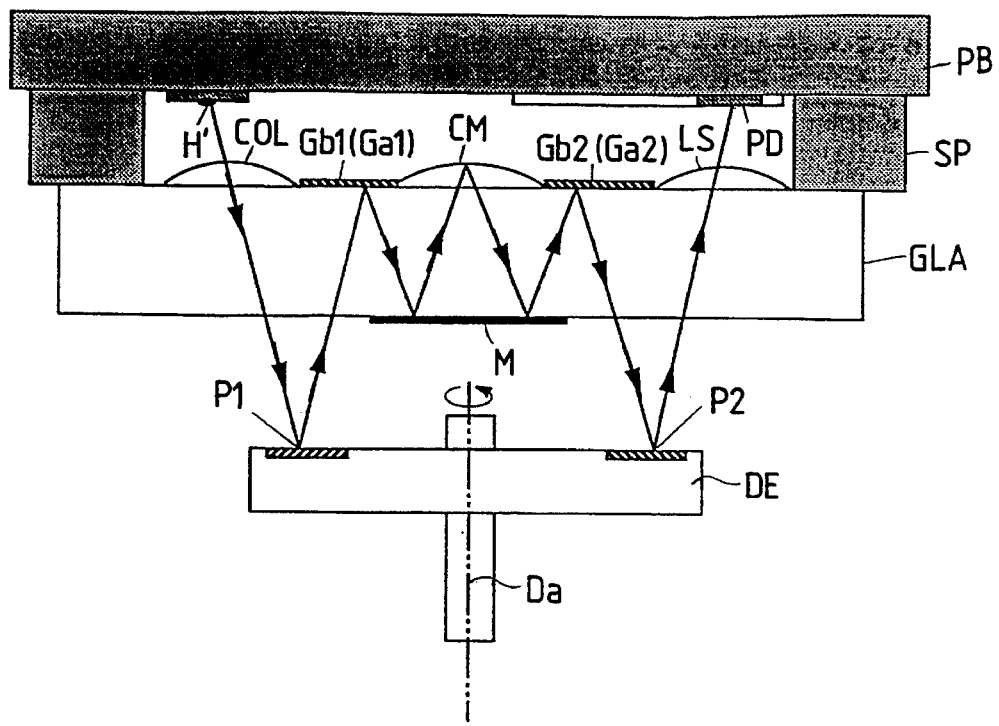
FIG. 3 shows a sectional view of a second embodiment of the present invention.

FIG. 3 shows a sectional view of the second embodiment. The light source H in the first embodiment is replaced by a planar light emission light source H' and the photo-sensing device PD and the light emitting device H are arranged on the same single planar substrate PB. A transparent substrate GLA having the circuit substrate PB, the lenses COL and LS, the diffraction gratings Ga1, Gb1, Ga2 and Gb2 and the mirror M and the like shaped on both surfaces thereof is bonded with an appropriate spacer SP therebetween. Other construction and operation are identical to those of the first embodiment.

Figure 4:
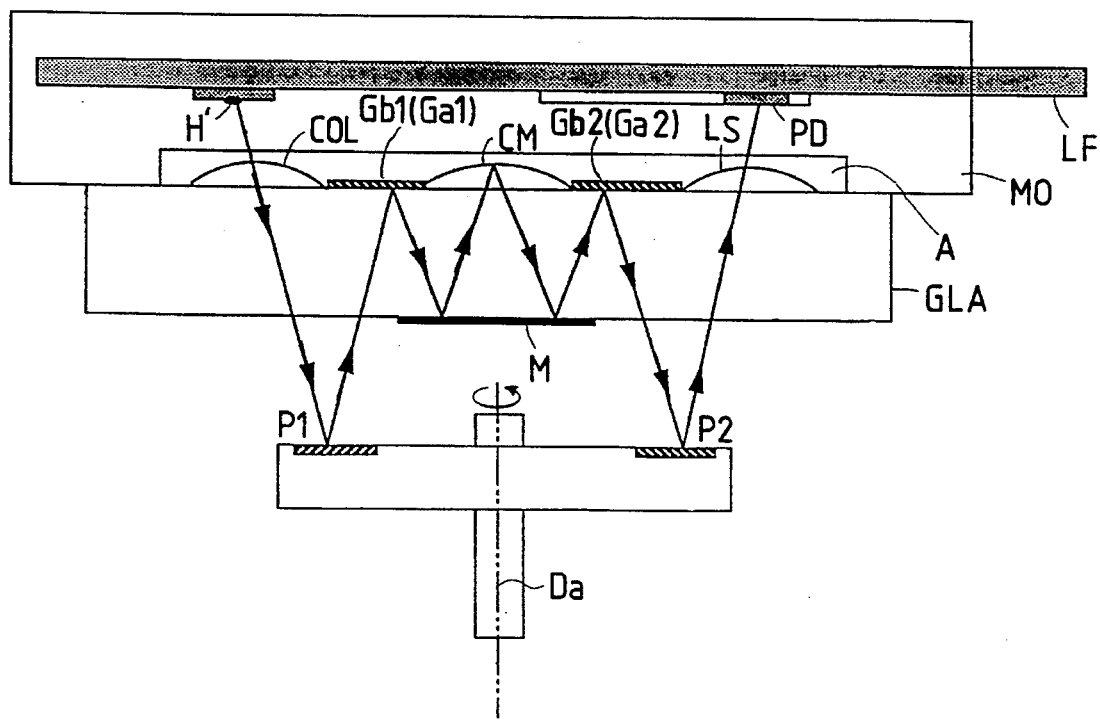
FIG. 4 shows a sectional view of a third embodiment of the present invention.

FIG. 4 shows a construction of a third embodiment in which the planar light emitting light source H of the second embodiment, the photo-sensing device PD and the optical unit are bonded. In the present embodiment, the light source H' and the photo-sensing device PD are mounted on a lead frame LF or a printed circuit board and the optical unit is joined to a mold unit Mo which is molded in U-shape while avoiding an area A on the periphery of the focusing lens COL.

Figure 5A:
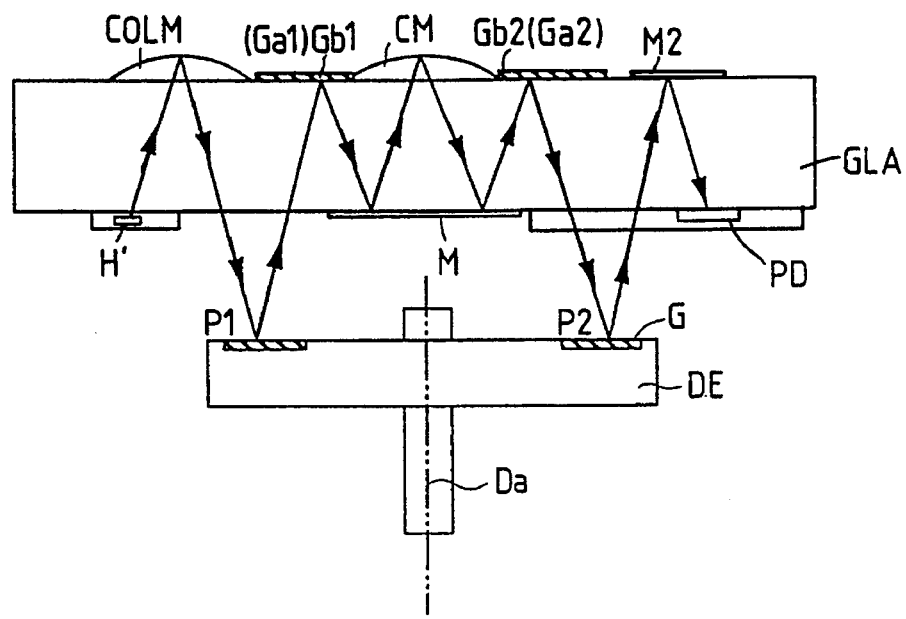
FIG. 5A shows a sectional view of a fourth embodiment of the present invention.
Figure 5B:
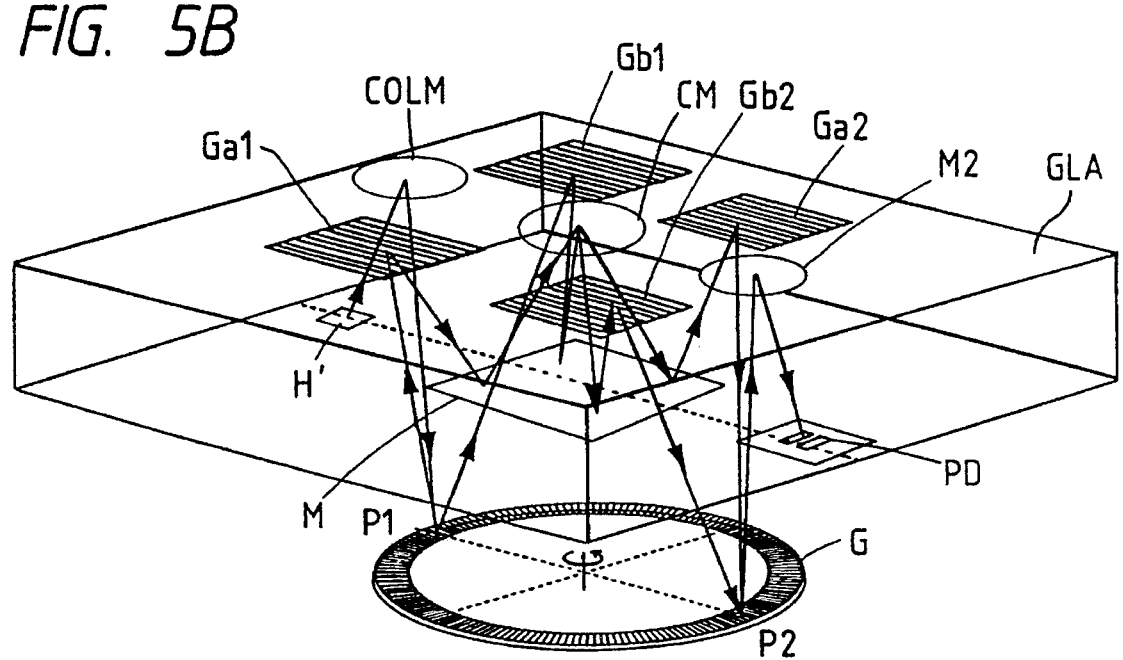
FIG. 5B shows a perspective view thereof.

FIGS. 5A and 5B show a sectional view and a perspective view of a fourth embodiment in which the photo-sensing device PD and the light emitting device H' of the third embodiment are formed on the plane of the radial grating of the transparent grating GLA. Instead of the condenser lens COL, a concave condensing mirror COLM is used. Instead of the lens LS, a mirror M2 is used.

In the present embodiment, all optical elements excluding the grating G, from the light source to the detector are arranged on the transparent substrate GLA. The following advantages can be obtained by this construction.

(1) Since all of the diffraction gratings Ga1, Gb1, Ga2 and Gb2, the concave mirror CM and the mirror M2 are reflective planes, they may be as a whole vapor-deposited by aluminum Al or the like after the formation of the concave planes and the diffraction gratings by the replica method. Thus, the fabrication of the optical unit is facilitated.

(2) Since the entire optical path excluding the projection/ reception window of the light beam is formed by the internal reflection of the optical unit, the contamination of the optical elements and the shift of the positions of the elements environment are hard to generate whereby a very stable encoder for surroundings can be produced.

Figure 6:
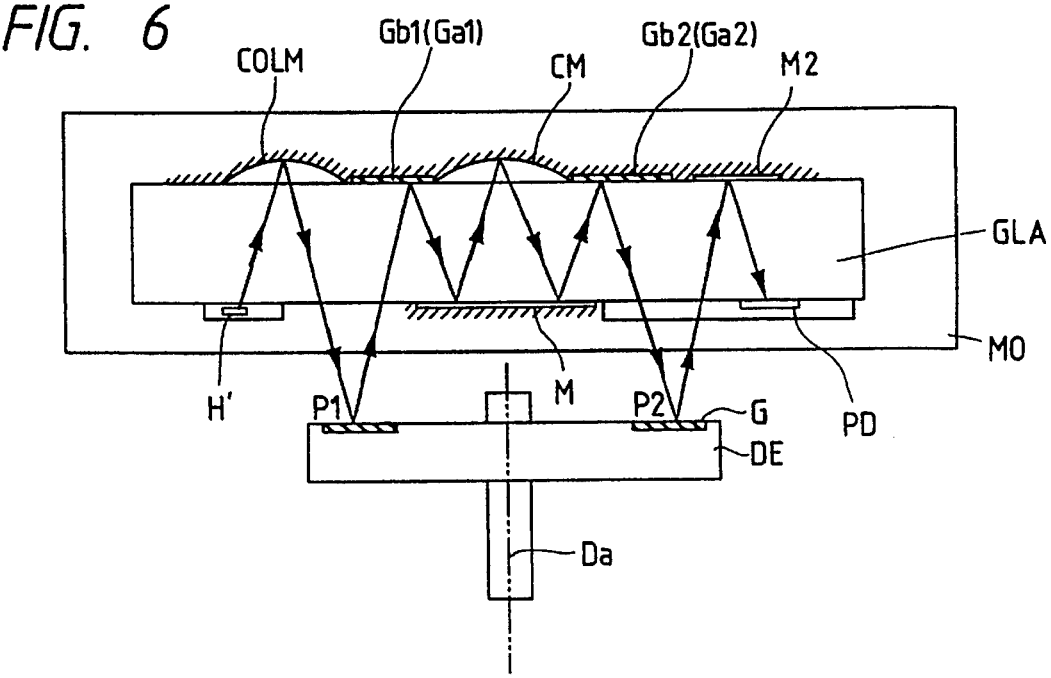
FIG. 6 shows a sectional view of a fifth embodiment of the present invention.

FIG. 6 shows a sectional view of a fifth embodiment. In the present embodiment, the optical unit of FIG. 5A is molded and the optical unit is sealed by using the mold Mo.

Figure 7:
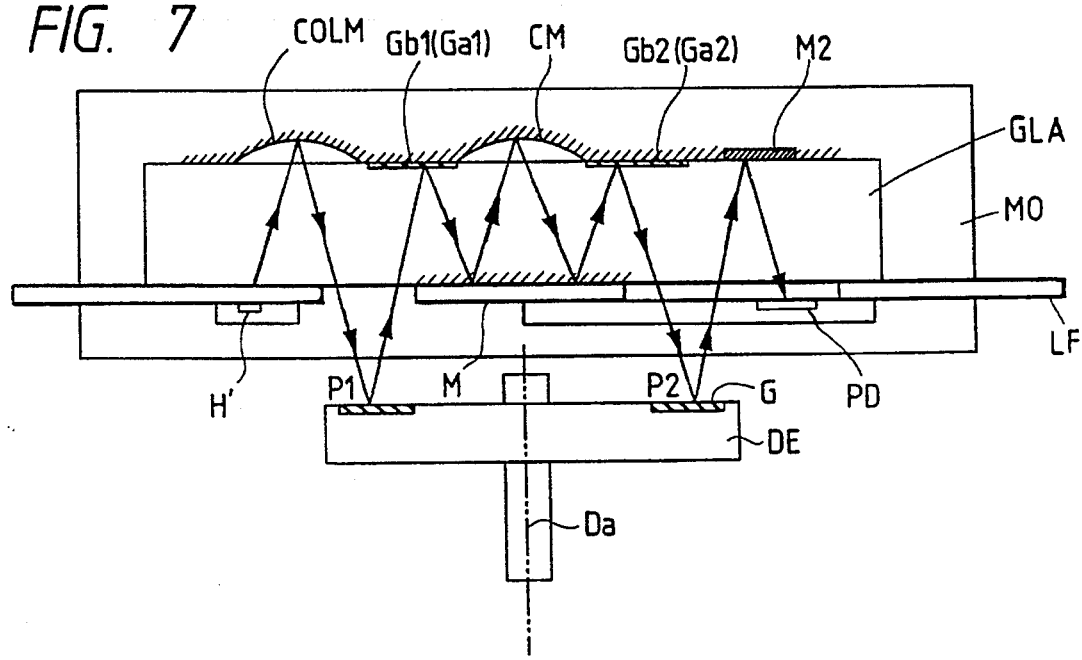
FIG. 7 shows a sectional view of a sixth embodiment of the present invention.

FIG. 7 shows a sectional view of a sixth embodiment. In the present embodiment, the optical unit of FIG. 5A, the light source H and the photo-sensing deice PD are joined through the lead frame LF and thereafter molded. The light source H and the photo-sensing device PD can be sandwiched between the transparent substrate GLA and the lead frame FL.

Figure 8A:
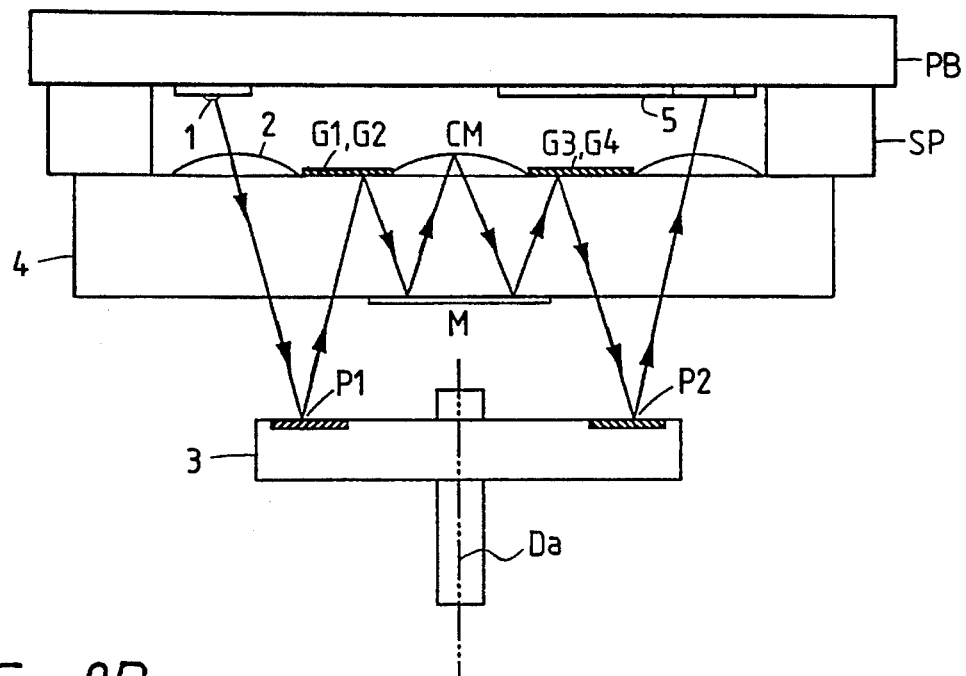
FIG. 8A shows a sectional view of a seventh embodiment of the present invention.
Figure 8B:
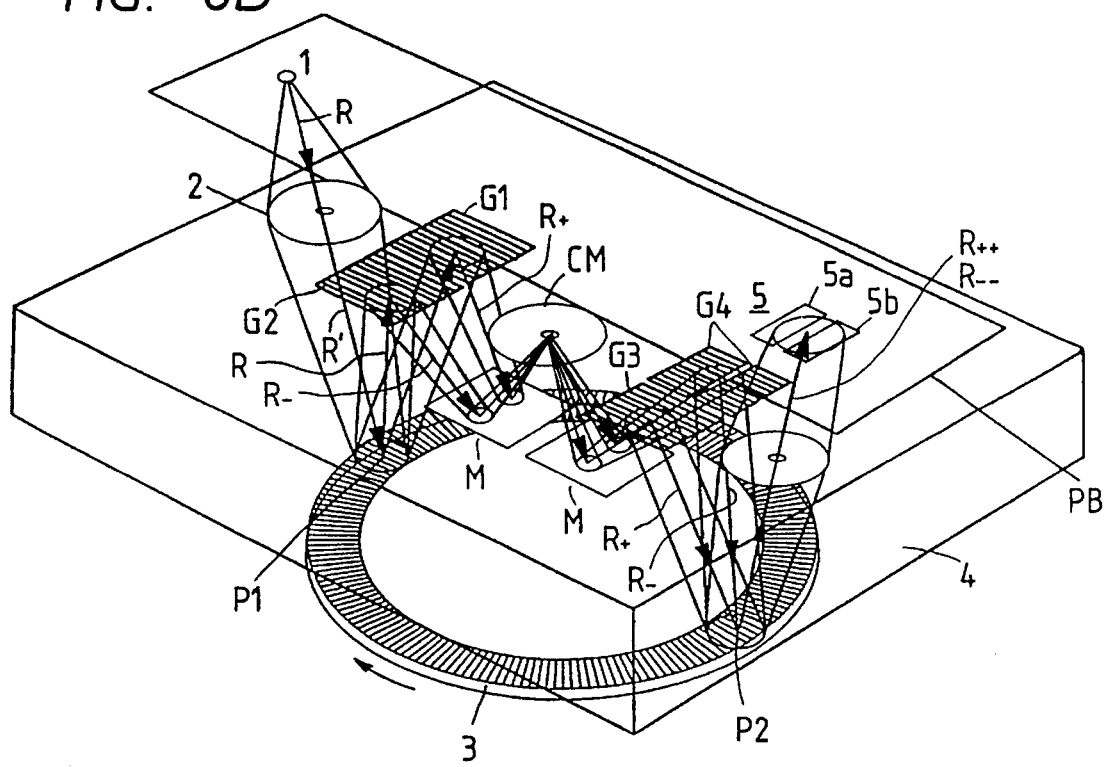
FIG. 8B shows a perspective view thereof.

FIGS. 8A and 8B show a sectional view and a perspective view of a seventh embodiment of the present invention. Numeral 1 denotes a light emitting device, numeral 2 denotes a condenser lens, numeral 3 denotes a relatively rotating disk, numeral 4 denotes a transparent substrate, numeral 5 denotes a photo-sensing device unit, M denotes a mirror, G1–G4 denote diffraction gratings and CM denotes a concave mirror.

Of those elements, the diffraction grating G4 is divided into two areas and the gratings are recorded by a ¼ pitch shift. The photo-sensing plane of the photo-sensing device unit 5 is also divided into two areas 5a and 5b so that they output voltage signals respectively in accordance with the incident light beam intensities thereto.

The divergence light beam R emitted from the light emitting device 1 is obliquely directed to the condensing lens 2 formed on the surface of the transparent substrate 4 and it is converted to a condensed light beam R' which passes through the transparent substrate 4 and is incident on a portion which center is a point P1 of the radial grating on the relatively rotating disk 3 to produce reflected and diffracted lights R+ and R−, which pass through the transparent substrate 4, are reflected and diffracted by the diffraction gratings G1 and G2 formed on the opposite plane and reflected back to the transparent substrate, reflected by the mirror M and incident on the center portion of the concave mirror CM. The two light beams crossed at the center of the concave mirror and reflected thereby repeat the multiple reflection within the transparent substrate and deflected by the diffraction gratings G3 and G4 to outgo out of the transparent substrate. Since the diffraction grating G4 is phase-divided into two areas, the light beam R is divided to the left light beam and the right one by mutually having a 90 degrees phase shift therebetween.

The two light beams R+ and R− are incident on the point P2 of the radial grating on the disk 3 to generate reflected and diffracted lights R++ and R−−, which pass through the transparent substrate 4 in the mutually superimposed optical path and are incident on the photo-sensing device chip unit 5 with an amplifier circuit which is fixed to the same substrate PB as that to which the light emitting device is fixed.

The interfered light beam R++−− has interference phases having a 90 degrees shift between the two areas. They are arranged so as to be incident on the corresponding photo-sensing planes 5a and 5b of the photo-sensing device 5.

The photo-sensing device unit 5 can obtain two interference signal outputs mutually having a phase difference therebetween. Based on those signals, a direction detection and a phase division, which are well-known are conducted by a signal processing system, not shown.

Figure 9:
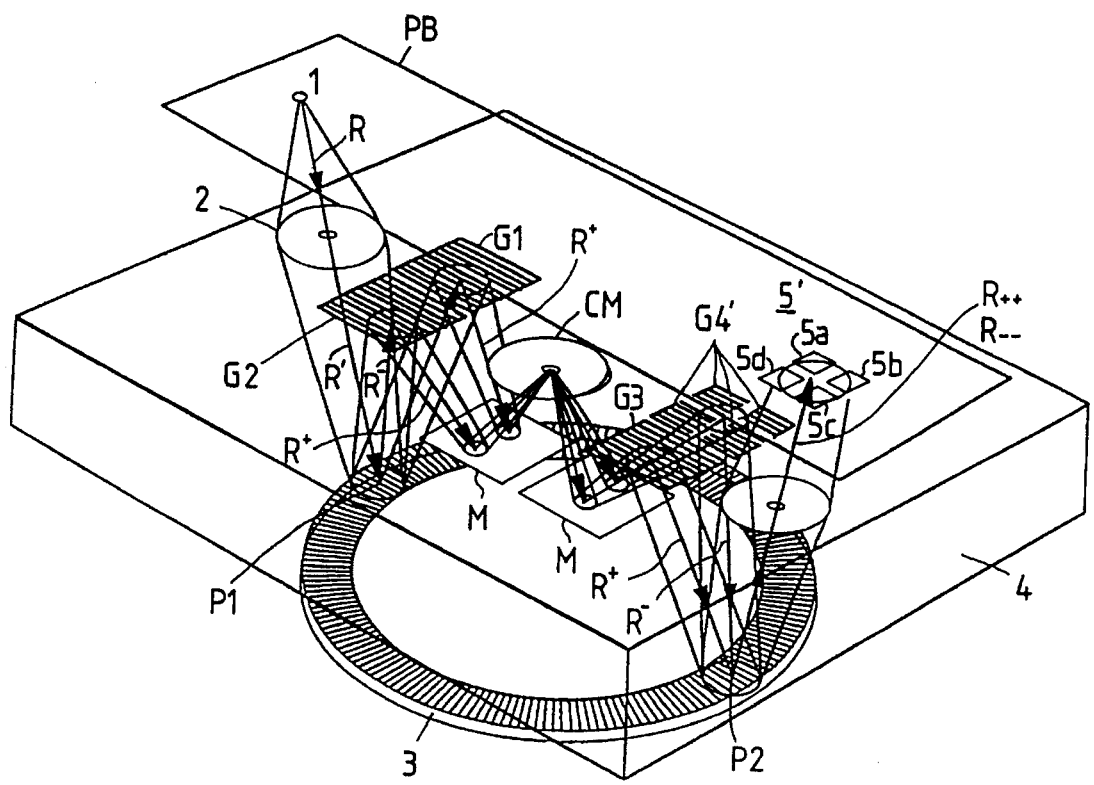
FIG. 9 shows a perspective view of an eighth embodiment of the present invention.

FIG. 9 shows a perspective view of an eighth embodiment of the present invention. In the present embodiment, all but the photo-sensing device unit 5' and the diffraction grating G4' are identical to those of the seventh embodiment.

The diffraction gratings G4' are divided into four areas which are recorded by a ¼ pitch shift between adjacent gratings (that is, by a ½ pitch shift in a crossing direction). The photo-sensing plane of the photo-sensing device unit 5' is also divided into four areas 5a, 5b, 5c and 5d which output respective voltage signals in accordance with the each incident light beam intensity thereto.

The divergence light beam R emitted from the light emitting device 1 is obliquely directed to the condensing lens 2 formed on the surface of the transparent substrate 4, passes through the transparent substrate 4 and is incident on a portion which center is the point P1 of the radial grating on the relatively rotating disk 3 to generate reflected and diffracted lights R+ and R−, which pass through the transparent substrate 4, are reflected and diffracted by the returned to the transparent substrate, are reflected by the mirror M and incident on the center portion of the concave mirror CM. The two light beams crossed at the center of the concave mirror and reflected thereby repeat the multiple reflection in the transparent substrate, are deflected by the diffraction grating G3 and G4' and outgo out of the transparent substrate. Since the diffraction grating G4' is divided into four areas by using a cross shape as a partition, the light beam R− has wavefront phases serially shifted by 90 degrees in the cross shape.

The two light beams R+ and R− are incident on a portion which center is the point P2 of the radial grating on the disk 3 to generate reflected and diffracted lights R++ and R−−, which pass through the transparent substrate 4 in a superimposed optical path and are incident on the photo-sensing device chip unit 5' with an amplifier circuit fixed to the same substrate PB as that to which the photo-sensing device is fixed.

The interference light beam R++−− has interference phases of 90 degrees shift in the four areas. They are arranged so as to be incident on corresponding photo-sensing planes 5a, 5b, 5c and 5d of the photo-sensing device 5'.

The photo-sensing device unit 5' obtains four interference signal outputs mutually having phase difference therebetween. The signals having 180 degrees phase difference, each other are subtracted in an external signal processing unit or an internal electronic circuit to obtain 2-phase signal outputs as push-pull signals. Since the push-pull signals has no change in the signal offset even if the light intensity of the light source changes or the light intensity of the interference signal changes due to the ununiformity diffraction light factor of the diffraction grating, they are stable signals and they can be also processed by the electrical insertion process which is well known in the signal processing system to attain the high resolution.

In the seventh and eighth embodiments, the diffraction gratings G4 and G4' are divided into two or four areas and the diffraction gratings have the 90 degrees phase shift from each other although any of the diffraction gratings G1, G2 and G3 may be divided instead of the diffraction gratings G4 and G4'.

In the eighth embodiment, the diffraction grating G4' is divided in the cross shape. Alternatively, the diffraction grating G4' may be horizontally divided into two areas and the diffraction grating G3 may be vertically divided into two areas, with the 90 degrees phase shift therebetween.

By increasing the number of times of reflection, the number of diffraction gratings can be increased depending on the state of the optical path by the internal reflection of the transparent substrate 4. In this case, needless to say, the wavefront may be divided in by using any diffraction grating.

The diffraction grating may be fabricated by the replica method, or by applying resist on the transparent substrate, drawing the grating pattern by a light beam (electron gun) and developing it. It may be further processed by glass etching to form the phase grating on the transparent substrate itself.

The light emitting device and the photo-sensing device (with the processing circuit) may be mounted on the printed circuit board or the lead frame.

In accordance with the present invention, the multi-phase signal which is essential to the encoder is produced by the simple construction of dividing a portion of the diffraction grating for deflecting the optical path to impart the phase shift, and a built-in type rotary encoder which is very compact and thin and can produce a high resolution can be produced.

What is claimed:

1. An apparatus for detecting information as for a rotation of a scale having a diffraction grating arranged thereon along a direction of detection of the rotation comprising:

light source unit for irradiating a light beam onto a first point on the diffraction grating of said scale;

said diffraction grating emitting two diffracted lights having a predetermined order from the first point by the irradiation of the light beam;

a transparent substrate to be almost parallelly arranged in a vicinity of a surface of said scale and having a plurality of optical elements arranged thereon;

said plurality of optical elements directing the two diffracted lights of the predetermined order to a second point other than said first point on the diffraction grating of said scale through an inside of said transparent substrate by effecting multiple deflection between surfaces of said transparent substrate arranged almost in parallel with the surface of said scale; and a photo-detector for detecting an interference light beam of diffracted lights generated out of said second point on which the two diffracted lights of the predetermined order are incident;

whereby the information on the rotation of said scale relative to the photo-detector is detected by the photo-detection by said photo-detector.

2. An apparatus according to claim 1, wherein said plurality of optical elements include two first and two second diffraction gratings, and the two diffracted lights of the predetermined order are diffracted and deflected by said first diffraction gratings to mutually make two optical paths of two diffracted lights cross and then diffracted and deflected by said second diffraction grating and directed to said second point.

3. An apparatus according to claim 2, wherein said plurality of optical elements further includes a concave mirror, and the optical paths diffracted and deflected by said first diffraction grating are mutually crossed at a substantially center of said concave mirror.

4. An apparatus according to claim 3, wherein said first and second diffraction gratings and said concave mirror are arranged on a first plane of said transparent substrate opposite to said scale, and the two diffracted lights of the predetermined order are introduced onto said second point while reflected between said first plane and a second plane of said transparent substrate on a same side as said scale.

5. An apparatus according to claim 4, wherein said light source unit and said photo-detector are arranged on said second plane.

6. An apparatus according to claim 3, wherein said concave mirror forms an image of said first point at said second point such that circumferential components of the rotation are arranged so as to be symmetric around a rotational center point and radial components of the rotation are arranged so as to make a direction reverse around the rotational center point.

7. An apparatus according to claim 1, wherein said plurality of optical elements include two first diffraction gratings for diffracting and deflecting the two diffracted lights of the predetermined order respectively to cross each other and two second diffraction gratings for diffracting and deflecting the two crossed diffracted lights of the predetermined order respectively to direct them to said second point, at least one of said two first diffraction gratings and said two second diffraction gratings are constructed by a plurality of diffraction grating areas arranged to have a phase shift from each other, and said photo-detector has a plurality of detection devices for detecting light waves generated by each of said plurality of diffraction grating areas.

8. An apparatus according to claim 1, further comprising a frame member for forming a container for accommodating said light source and said photodetector together with said transparent substrate.

9. An apparatus according to claim 1, wherein said light source unit, said transparent substrate and said photo-detector are integrally sealed.

10. An apparatus according to claim 1, wherein said light source unit includes a light source device and a lens.

11. An apparatus for detecting information as for a rotation of a scale having a diffraction grating arranged thereon along a direction of detection of the rotation comprising:

a light source unit for irradiating a light beam onto a first point on the diffraction grating of said scale;

said diffraction grating emitting two diffracted lights having a predetermined order from the first point by the irradiation of the light beam;

a transparent substrate to be arranged almost in parallel in a vicinity of a surface of said scale and having a plurality of optical elements arranged thereon;

said plurality of optical elements directing the two diffracted lights of the predetermined order to a second point other than said first point on the diffraction grating of said scale through an inside of said transparent substrate by effecting multiple deflection between one surface faced to the surface of said scale and another surface opposite with said one surface of said transparent substrate; and a photo-detector for detecting an interference light beam of diffracted lights generated out of said second point on which the two diffracted lights of the predetermined order are incident;

whereby the information on the rotation of said scale relative to the photo-detector is detected by the photo-detection by said photo-detector.

* * * * *

UNITED STATES PATENT AND TRADEMARK OFFICE
CERTIFICATE OF CORRECTION

PATENT NO. : 5,498,870

DATED : March 12, 1996

INVENTOR(S) : KOH ISHIZUKA

It is certified that error appears in the above-indentified patent and that said Letters Patent is hereby corrected as shown below:

COLUMN 1

Line 30, "a a" should read --a--.

COLUMN 2

Line 55, "ponit" should read --point--.

COLUMN 3

Line 37, "in" should be deleted.

COLUMN 4

Line 32, "become" should read --becomes--.

COLUMN 6

Line 46, "deice" should read --device--.

COLUMN 8

Line 14, "has" should read --have--.
Line 59, "light source" should read --a light source--.

UNITED STATES PATENT AND TRADEMARK OFFICE
CERTIFICATE OF CORRECTION

PATENT NO. :     5,498,870
DATED      :     March 12, 1996
INVENTOR(S) :
                 KOH ISHIZUKA It is certified that error appears in the above-indentified patent and that said Letters Patent is hereby corrected as shown below:

COLUMN 9

Line 21, "grating" should read --gratings--.

Signed and Sealed this

Twenty-third Day of July, 1996

Attest:

BRUCE LEHMAN

Attesting Officer    Commissioner of Patents and Trademarks